(12) United States Patent
Huang-Fu et al.

(10) Patent No.: US 11,910,488 B2
(45) Date of Patent: Feb. 20, 2024

(54) ENHANCEMENT OF FEATURE SUPPORT AFTER INTERWORKING

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Po-Ying Chuang, Hsin-Chu (TW); Po Kuang Lu, Hsin-Chu (TW)

( * ) Notice: Subject to any disclaimer, the term of this patent is extended or adjusted under 35 U.S.C. 154(b) by 0 days.

(21) Appl. No.: 18/117,390

(22) Filed: Mar. 3, 2023

(65) Prior Publication Data
US 2023/0209654 A1     Jun. 29, 2023

Related U.S. Application Data

(63) Continuation of application No. 16/838,186, filed on Apr. 2, 2020, now Pat. No. 11,622,415.

(60) Provisional application No. 62/827,914, filed on Apr. 2, 2019.

(51) Int. Cl.
*H04W 80/10* (2009.01)
*H04W 8/08* (2009.01)
*H04W 28/02* (2009.01)

(52) U.S. Cl.
CPC ............. *H04W 80/10* (2013.01); *H04W 8/08* (2013.01); *H04W 28/0247* (2013.01); *H04W 28/0263* (2013.01)

(58) Field of Classification Search
CPC ............... H04W 8/08; H04W 28/0247; H04W 28/0263; H04W 36/14; H04W 80/10
See application file for complete search history.

(56) References Cited

U.S. PATENT DOCUMENTS

| | | | |
|---|---|---|---|
| 2019/0159157 A1 | 5/2019 | Gupta | H04W 60/005 |
| 2019/0190775 A1 | 6/2019 | Buckley | H04M 15/07 |
| 2019/0246436 A1 | 8/2019 | Kim | H04W 76/10 |
| 2019/0313310 A1* | 10/2019 | Won | H04W 36/0033 |
| 2019/0357090 A1 | 11/2019 | Drevon et al. | |
| 2020/0077315 A1* | 3/2020 | Jin | H04W 76/10 |
| 2020/0374765 A1* | 11/2020 | Zong | H04W 76/22 |

* cited by examiner

*Primary Examiner* — Khoa Huynh
(74) *Attorney, Agent, or Firm* — Zheng Jin; Helen Mao; Imperium Patent Works

(57) ABSTRACT

A method of enhancing IP packet forwarding feature support after interworking is proposed. When a PDU session in 5GS is transferred to a PDN connection in EPS, the UE shall assume the feature is supported after inter-system change from 5GS to EPS. When a PDN connection is established in EPS, the network indicated that the feature is not supported, and the network provided 5GSM parameters for ESM/5GSM interworking for this PDN connection, then UE shall assume the feature is supported after inter-system change from EPS to 5GS, the UE shall also assume the feature is supported after inter-system change from 5GS back to EPS. The IP packet forwarding features include PS data off and local IP address in TFT.

8 Claims, 4 Drawing Sheets

ENHANCEMENT OF FEATURE SUPPORT AFTER INTERWORKING

CROSS REFERENCE TO RELATED APPLICATIONS

This application is a continuation, and claims priority under 35 U.S.C. § 120 from nonprovisional U.S. patent application Ser. No. 16/838,186, entitled "ENHANCEMENT OF FEATURE SUPPORT AFTER INTERWORKING", filed on Apr. 2, 2020, the subject matter of which is incorporated herein by reference. Application Ser. No. 16/838,186, in turn, claims priority under 35 U.S.C. § 119 from U.S. Provisional Application No. 62/827,914, entitled "Enhancement of Feature Support after Interworking", filed on Apr. 2, 2019, the subject matter of which is incorporated herein by reference.

TECHNICAL FIELD

The disclosed embodiments relate generally to wireless communication, and, more particularly, to method of supporting different IP packet forwarding features during inter-system change between 5G system (5GS) and 4G LTE systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The 3$^{rd}$ generation partner project (3GPP) network normally includes a hybrid of 2G/3G/4G systems. The Next Generation Mobile Network (NMN) board, has decided to focus the future NGMN activities on defining the end-to-end requirements for 5G new radio (NR) systems.

LIE networks axe packet-switched (PS) IP networks. This means that the networks deliver all data traffic in IP packets, and provide users with Always-On IP Connectivity. When UE joins an LTE network, a Packet Data Network (PDN) address, (i.e., the one that can be sued on the PDN) is assigned to the UE for its connection to the PDN. LTE calls the users "IP access connection" an evolved packet system (EPS) bearer, which is a connection between the UE and the PDN gateway (PGW). The PGW is the default gateway for the UEs IP access. LTE has defined a Default EPS Bearer to provide the Always-On IP Connectivity. By introducing Always-On IP Connectivity in 3GPP network, became difficult for the subscriber to have explicit control of the traffic sent or received by its UE, which could lead to unexpected charging.

3GPP PS_Data_Off feature is thus introduced to meet the requirements. The PS_Data_Off feature prevents transport via 3GPP access of all IP packets except those related to 3GPP PS_Data_Off Exempt services. The UE discovers a PGW supports 3GPP PS_Data_Off feature at initial attach and during the establishment of a PDN connection via the presence of the 3GPP PS_Data_Off Support Indication in the Create Session response message. When the UE requests a new PDN connectivity, the CE shall include the indication in the PCO within the PDN Connectivity Request message. When the UE changes its PS_Data_Off status, the CE shall report a change of its 3GPP PS_Data_Off status in PCO by using Bearer Resource Modification procedure. For IP Multimedia Subsystem (IMS) services, the UE shall inform the IMS domain in initial REGISTER request and subsequent re-REGISTER request for the status change.

The UE and the PDN gateway or serving gateway use packet filters to map IP traffic onto the different bearers. Each EPS bearer is associated with a Traffic. Flow Template (TFT) that includes the packet filters for the bearer. These TFTs may contain packet filters for uplink traffic (UL TFT) and/or downlink traffic (DL TFT). The TFTs are typically created when a new EPS hearer is established, and they are then modified during the lifetime of the EPS bearer. The TFTs contain packet filter information that allows the UE and PGW to identify the packets belonging to a certain IP packet flow aggregate. The packet filter information includes the source and destination IP address, source and destination port, as well as protocol identifier. The local UE IP address is not contained in the TFT since it is understood that the UE is only assigned a single IP address per PDN connection. However, if a UE acts as a router for other devices in a local network, these other devices would use IP addresses from the prefixes assigned by EPC. In order for the UP to provide correct mapping of uplink traffic onto bearers, there is in this case a need to also include the specific UE IP address used by the IP flows.

In 5G, a Protocol Data Unit (PDU) session establishment is a parallel procedure of a Packet Data Network (PDN) connection procedure in 4G. A PDU session defines the association between the UP and the data network that provides a PDU connectivity service. Based on the 3GPP specification for 5G, the local IP address in TFT and the PS data off features are supported by the 5G CN by default. However, there are some issues arise from inter-system change. After inter-system change from 5GS to EPS, whether those features are defined is not defined. In addition, for a PDN connection established in EPS, if the feature is not supported, but the network provided parameters for evolved session management/5G session management (ESM/5GSM) interworking from EPS to 5GS, the UE interpretation is not defined.

A solution is sought.

SUMMARY

A method of enhancing IP packet forwarding feature support after interworking is proposed. When a PDU session in 5GS is transferred to a PDN connection in EPS, the UE shall assume the feature is supported after inter-system change from 5GS to EPS. When a PDN connection is established in EPS, the network indicated that the feature is not supported, and the network provided 5GSM parameters for ESM/5GSM interworking for this PDN connection, then UE shall assume the feature is supported after inter-system change from EPS to 5GS, the UE shall also assume the feature is supported after inter-system change from 5GS back to EPS. The IP packet forwarding features include PS data off and local IP address in TFT.

In one embodiment, a UE maintains a Protocol data unit (PDU) session in a 5G system (5GS) of a mobile communication network. The UE supports a packet-switched data-off (PS_Data_Off) feature for the PDU session. The UE performs an inter-system change and thereby switching from 5GS to an evolved packet system (EPS). The UE converts the PDU session to a packet data network (PDN) connection in EPS. The UE assumes that the PS_Data_Off feature is supported for the PDN connection after performing the inter-system change from 5GS to EPS. The UE monitors a PS_Data_Off status change and in response initiating a Bearer Resource Modification procedure with a 3GPP PS_Data_Off UE Status.

In another embodiment, a UE maintains a Protocol data unit (PDU) session in a 5G system (5GS) of a mobile communication network. The UE supports a local IP address in Traffic Flow Template (TFT) feature for the PDU session. The UE converts the PDU session in 5GS to a packet data network (PDN) connection upon performing an inter-system change from 5GS to an evolves packet system (EPS). The UE assumes that the network supports the local IP address in TFT feature for the PDN connection. The UE receives a modify EPS bearer context request or an activated dedicated EPS bearer context request message carrying a TFT information element (IE) from the network. The TFT IE carries a TFT operation code and includes a local IP address. The UE executes the TFT operation code including the local IP address without diagnosing an error.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
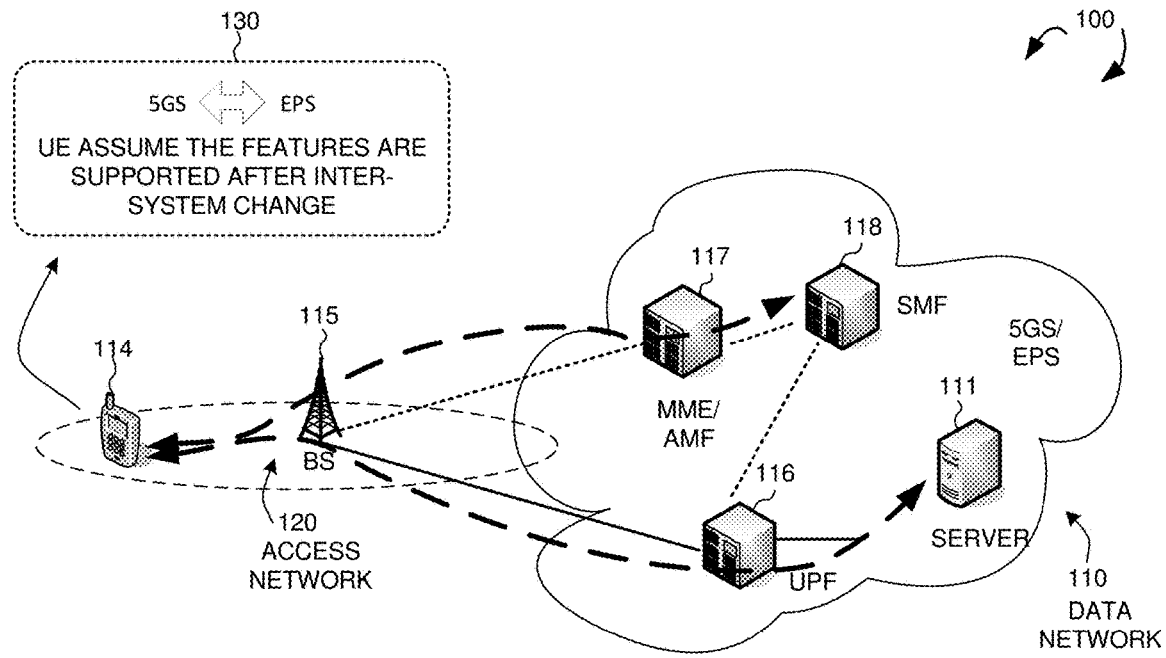
FIG. 1 illustrates an exemplary EPS/5GS network providing enhancement of feature support with inter-system change in accordance with one novel aspect of the present invention.

FIG. 1 illustrates an exemplary 4G LTE or 5G new radio (NR) network 100 providing enhanced feature support with inter-system change in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS/gNB 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PIM sessions and managing PDU session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP packets, and provide users with Always-On IP Connectivity. When. OF joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the PDN gateway (PGW). The PGN is the default gateway for the UE's IP access. EPS has defined a Default EPS Bearer to provide the IP Connectivity that is Always-On. In 5G, a Protocol Data Unit (PDU) session establishment procedure is a parallel procedure of a PDN connection procedure in 4G. A PDU session defines the association between the UE and the data network that provides a PDU connectivity service.

By introducing Always-On IP Connectivity in 3GPP network, it became difficult for the subscriber to have explicit control of the traffic sent or received by its UE, which could lead to unexpected charging. 3GPP PS_Data_Off feature is thus introduced to meet the requirements. The PS_Data_Off feature prevents transport via 3GPP access of all IP packets except those related to 3GPP PS_Data_Off Exempt services. Based on the 3GPP specification for 5G, the "PS_Data_Off" feature is supported by the 5G CN by default. Another default feature supported by the 5G CN is called "Local IP address in TFT". Each EPS bearer is associated with a Traffic Flow Template (TFT) that includes the packet filters for the bearer. In order for the UE to provide correct mapping of uplink traffic onto bearers, there is a need to include the specific UE IP address used by the IP flows in the TFT.

However, those features may not always be supported in EPS, and there are some issues arise from inter-system change. After inter-system change from 5GS to EPS, whether those features are defined is not defined. In addition, for a PDN connection established in EPS, if the feature is not supported, but the network provided parameters for evolved session management/5G session management (ESM/5GSM) interworking from EPS to 5GS, the UE interpretation is not defined. In accordance with one novel aspect, as depicted by 130, when a PDU session is transferred to a PDN connection, the UE shall assume the feature is supported after inter-system change from 5GS to EPS. When a PDN connection is established in EPS, the network indicated that the feature is not supported, and the network provided 5GSM parameters for ESM/5GSM interworking for this PDN connection, then UE shall assume the feature is supported after inter-system change from EPS to 5GS, the UE shall also assume the feature is supported after inter-system change from 5GS back to EPS.

Figure 2:
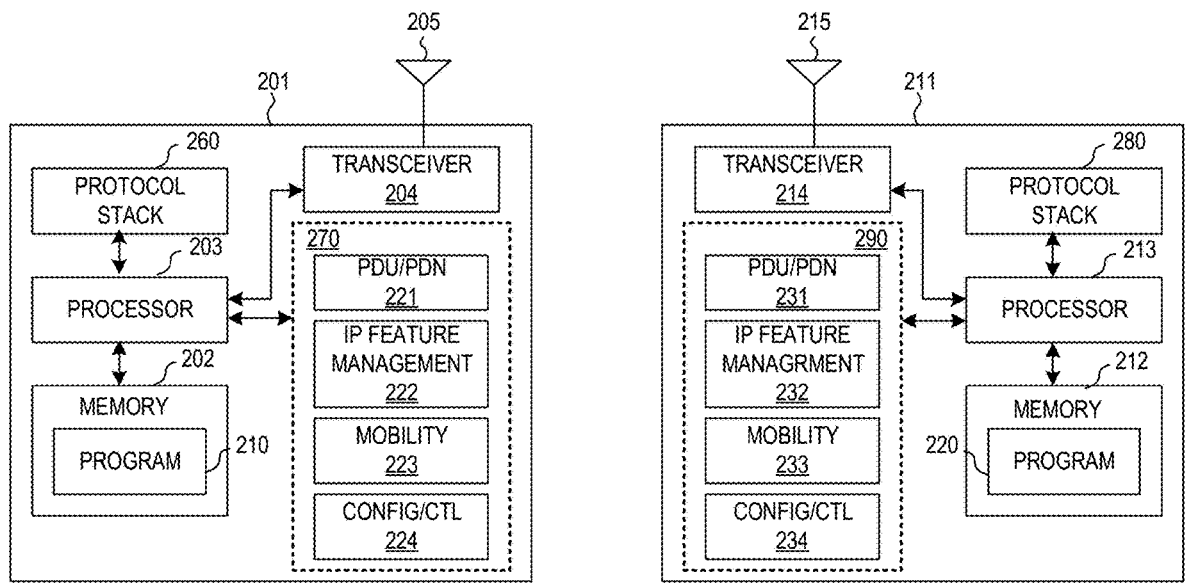
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuit 290. PDU session and PDN connection handling circuit 231 handles PDU/PDN establishment and modification procedures. IP feature management circuit 232 manages different IP features for UE. mobility handling circuit 233 that handles handover and inter-system change. Configuration and control circuit 234 provides different parameters to configure and control UE of related functionalities including PDU session and PDN connection, mobility, and session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session and PDN connection handling circuit 221 that performs PDU session and PDN connection establishment and modification procedures with the network, an IP feature handling circuit 222 that manages IP features including PS_Data_Off and local IP address in TFT, a mobility handling circuit 223 that handles handover and inter-system change, a config and control circuit 224 that handles configuration and control parameters for PDU session or PDN connection, mobility, and session management. In one example, the UE shall assume the IP packet forwarding features (e.g., PS data off and local IP address in TFT) are supported after inter-system change from 5GS to EPS, assume those features are supported after inter-system change from EPS to 5GS, and also assume those features are supported after inter-system change back to EPS.

Figure 3:
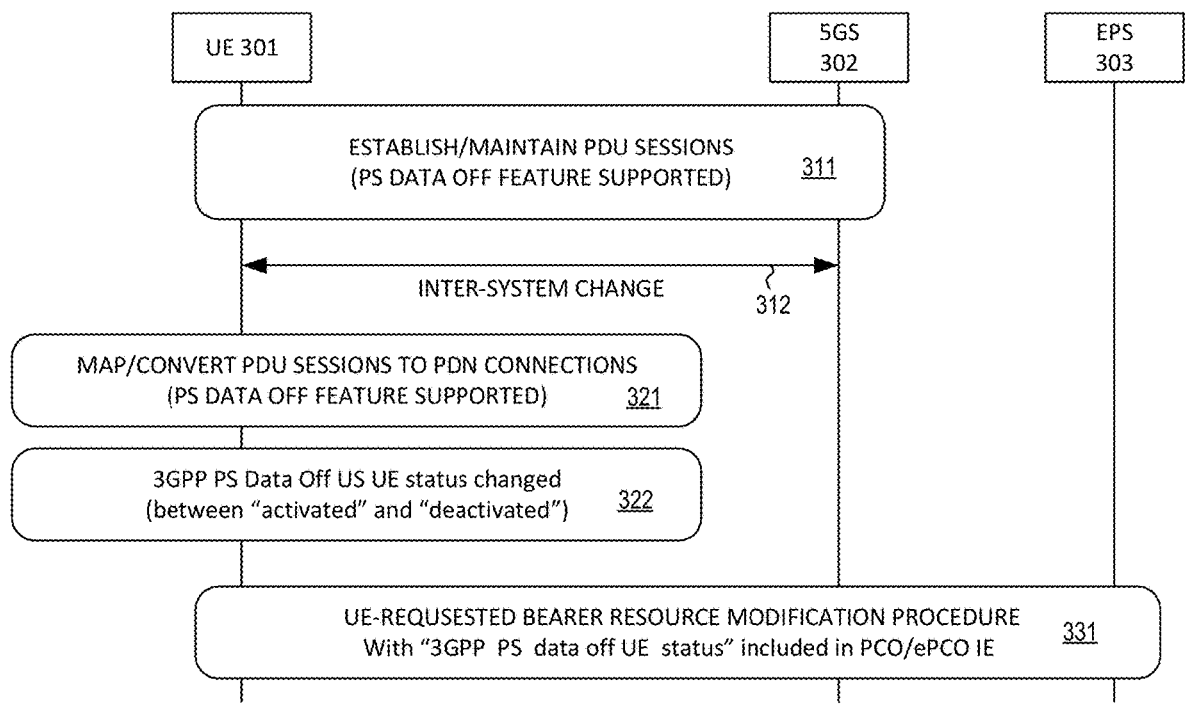
FIG. 3 illustrates a first embodiment of inter-system change from 5GS to EPS and handling of PS_Data_Off feature in accordance with one novel aspect.

FIG. 3 illustrates a first embodiment of inter-system change from 5GS to EPS and handling of PS_Data_Off feature in accordance with one novel aspect. The PS_Data_Off feature prevents transport via 3GPP access of au IP packets except those related to 3GPP PS_Data_Off Exempt services. In 4G LTE, the UE discovers a PGW supports 3GPP PS_Data_Off feature at initial attach and during the establishment of a PDN connection via the presence of the 3GPP PS_Data_Off Support Indication during the activation of the default bearer of a PDN connection, e.g., in an activate default. EPS bearer context request message. When the UE requests a new PDN connectivity, the UE shall include the indication in the PCO within the PDN Connectivity Request message. When the UE changes its PS_Data_Off status, the UE shall report a change of its 3GPP PS_Data_Off status in PCO by using Bearer Resource Modification procedure. For IP Multimedia Subsystem (IMS) services, the UE shall inform the IMS domain in initial REGISTER request and subsequent re-REGISTER request for the status change. The PS_Data_Off feature may be supported by EPC. In 5G NR, the 3GPP PS_Data_Off feature is supported for all PDU sessions by default, i.e., is a mandatory feature for 5GCN.

In step 311, UE 301 and 5GS network 302 establish or maintain a PDU session. In 5GS, the PS_Data_Off feature is supported for all PDU sessions by default. In step 312, UE 301 performs an inter-system change upon receipt of inter-system change command from the network (e.g., a handover command or an RRC release message with redirection information). For example, the UE follows the instruction provided by the network to camp on a cell of another system. Alternatively, the inter-system change can also be triggered by cell re-selection. For example, when the UE is idle mode and performs cell reselection, and the only cell the UE can find is a cell of another system so the UE will actively perform inter-system change. In step 321, UE 301 maps/converts the PDU session to a PDN connection. UE 301 assumes that PS_Data_Off feature is supported for the PDN connection upon the inter-system change. When both the network and the UE support PS_Data_Off feature, the UE needs to monitor and indicate the PS_Data_Off UE status when it is changed. The PS_Data_Off UE status can be activated—the user turns off mobile data (via iOS/Android configuration), and the mobile data transmission is not allowed for both UL/DL directions. The PS_Data_Off UE status can be deactivated—the user turns on mobile data (via iOS/Android configuration), and the mobile data transmission is allowed. In step 322, UE 301 monitors the UE status of the PS_Data_Off feature, e.g., whether the 3GPP PS_Data_Off UE status is activated (mobile data transmission is not allowed) or deactivated (mobile data transmission is allowed) by a user. If the status is changed, then in step 331, UE 301 initiates a Bearer Resource Modification procedure, by sending a bearer resource modification request message to EPS 303. The bearer resource modification request message comprises a "3GPP PS data off UE status" included in a PCO/ePCO IE, which indicates to the network whether the PS_Data_Off UE status is either activated (mobile data transmission is not allowed), or deactivated (mobile data transmission is allowed) for the PDN connection.

Figure 4:
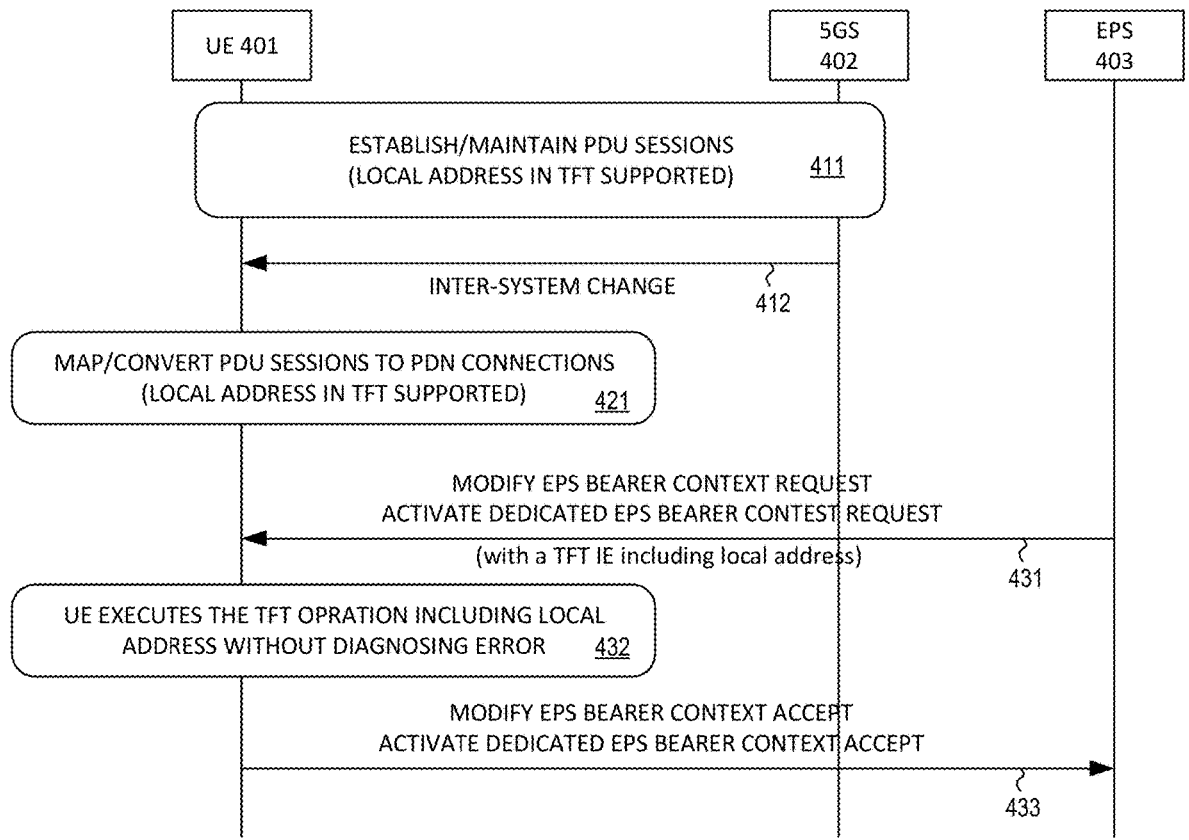
FIG. 4 illustrates second embodiment of inter-system change from 5GS to EPS and handling of Local IP address in Traffic Flow Template (TFT) feature in accordance with one novel aspect.

FIG. 4 illustrates second embodiment of inter-system change from 5GS to EPS and handling of Local IP address in Traffic Flow Template (TFT) feature in accordance with one novel aspect. In 4G LTE, Each EPS bearer is associated with a TFT that includes the packet filters for the EPS bearer. These TFTs may contain packet filters for uplink traffic (UL TFT) and/or downlink traffic (DL TFT). The TFTs are typically created when a new EPS bearer is established, and they are then modified during the lifetime of the EPS bearer. The TFTs contain packet filter information that allows the UE and PGW to identify the packets belonging to a certain IP packet flow aggregate. The packet filter information includes the source and destination IP address, source and destination port, as well as protocol identifier. The local UE IP address is not contained in the TFT since it is understood that the UE is only assigned a single IP address per PDN connection. However, if a UT, acts as a router for other devices in a local network, these other devices would use IP addresses from the prefixes assigned by EPC. In order for the UE to provide correct mapping of uplink traffic onto bearers, there is in this case a need to also include the specific UE IP address used by the IP flows. In 5G NR, the local IP address in TFT feature is supported for all PDU sessions by default.

In step 411, UE 401 and 5GS network 402 establish or maintain a PDU session. In 5GS, the Local IP address in TFT feature is supported for all PDU sessions by default. In step 412, UE 401 receives an inter-system change command from the network. In step 421, UE 401 maps/converts the PDU session to a PDN connection. UE 401 assumes that Local IP address in TFT feature is supported for the mapped PDN connection upon the inter-system change. In step 431, UE 401 receives a modify EPS bearer context request message or an activate dedicated EPS bearer context request message from EPS 403. The request message includes a TFT IE, which carries different TFT operations and a local IP address. The different TFT operations include "create new TFT", "add packet filters to existing TFT", and "replace packet filters in existing TFT". In step 432, UE 401 executes the TFT operation including the local IP address without diagnosing error. In step 433, UE 401 sends a modify EPS bearer context accept message or an activate dedicated EPS bearer context accept message upon successful execution. If UE assumes the network does not support local IP address in TFT, then UE will indicate "semantic error" upon receipt a TFT IE with local IP address.

Figure 5:
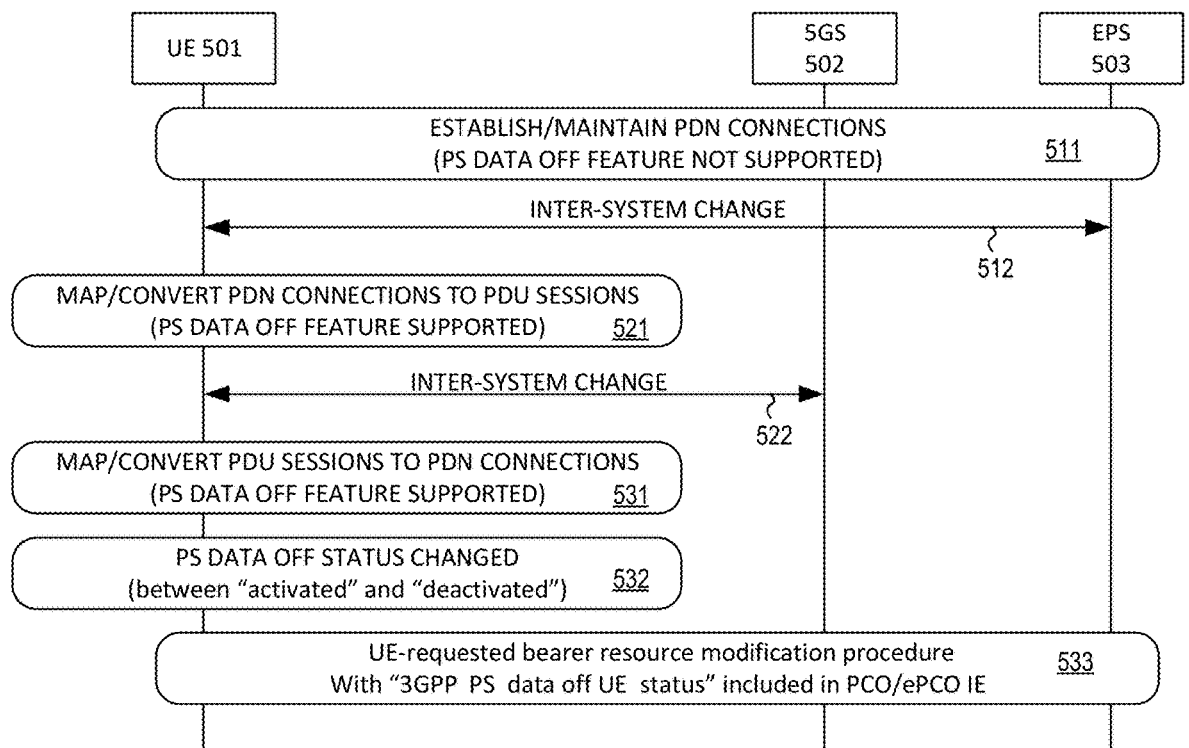
FIG. 5 illustrates a first embodiment of inter-system change from EPS to 5GS and back to EPS and handling of PS_Data_Off feature in accordance with one novel aspect.

FIG. 5 illustrates a first embodiment of inter-system change from EPS to 5GS and back to EPS and handling of PS_Data_Off feature in accordance with one novel aspect. In step 511, UE 501 establishes a PDN connection with EPS 503. During the PDN connection establishment, a 3GPP PS_Data_Off Support Indication can be included in an activate default EPS bearer context request message to indicated whether the feature is supported by the network. For example, such feature is not supported for the PDN connection if there is no PS_Data_Off Support Indication included in the activate default EPS bearer context request message. In step 512, UE 501 performs an inter-system change from EPS to 5GS. In step 521, UE 501 converts the PDN connection to a PDU session. UE 501 assumes that PS_Data_Off feature is supported for the PDU session upon the inter-system change. In step 522, UE 501 performs another inter-system change from 5GS back to EPS. In step 531, UE 501 converts the PDU session back to the PDN connection. UE 501 assumes that PS_Data_Off feature is supported for the PDN connection upon the inter-system change. In step 532, UE 501 monitors the UE status of the PS_Data_Off feature, e.g., whether the 3GPP PS_Data_Off UE status is activated (mobile data transmission is not allowed) or deactivated (mobile data transmission is allowed) by a user. If the status is changed, then in step 533, UE 501 initiates a Bearer Resource Modification procedure, by sending a bearer resource modification request message to EPS 503. The bearer resource modification request message comprises a "3GPP PS data off UE status" included in a PCO/ePCO IE, which indicates to the network whether the PS_Data_Off UE status is either activated (mobile data transmission is not allowed), or deactivated (mobile data transmission is allowed) for the PDN connection.

Figure 6:
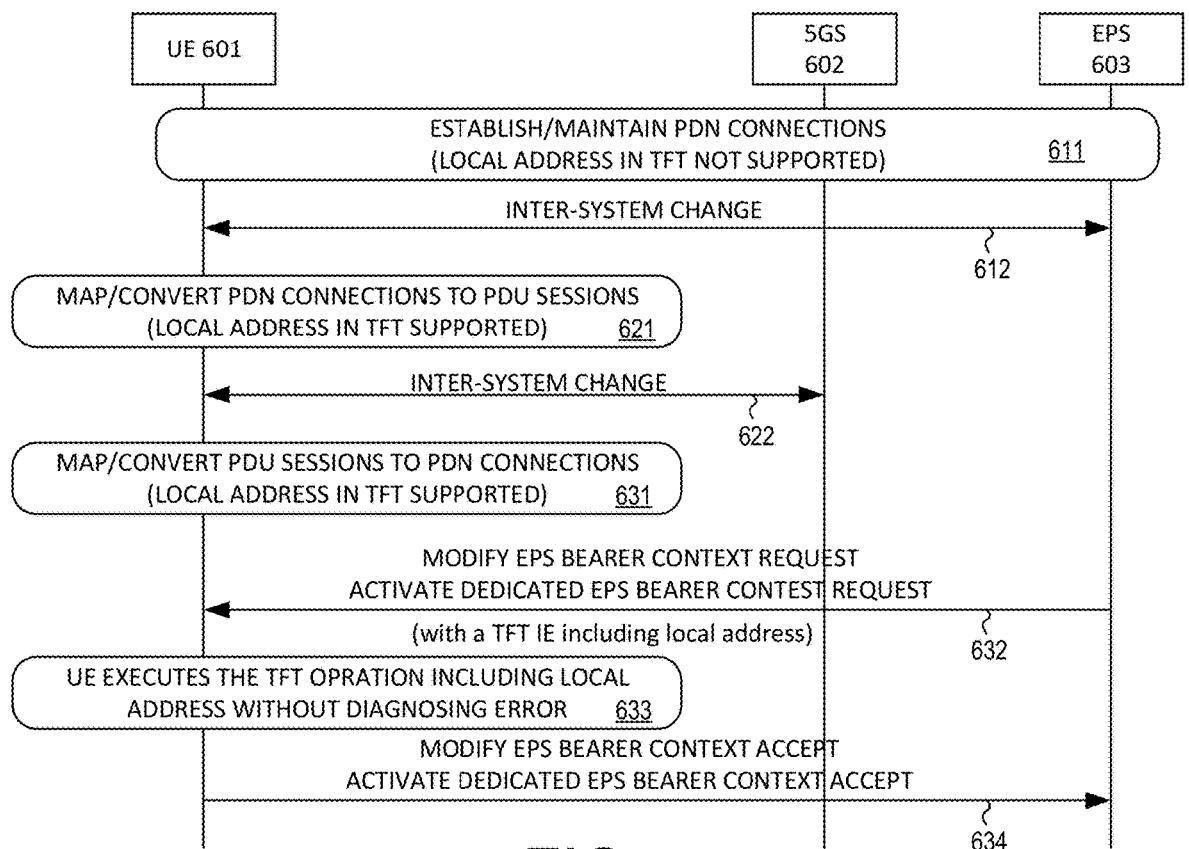
FIG. 6 illustrates second embodiment of inter-system change from EPS to 5GS and back to EPS and handling of Local IP address in Traffic Flow Template (TFT) feature in accordance with one novel aspect.

FIG. 6 illustrates second embodiment of inter-system change from EPS to 5GS and back to EPS and handling of Local IP address in Traffic Flow Template (TFT) feature in accordance with one novel aspect. In step 611, UE 601 establishes a PDN connection with EPS 603. The TFTs are typically created when a new EPS bearer is established, and they are then modified during the lifetime of the EPS bearer. During the PDN connection establishment, a Network support of Local address in TFT indicator can be included in an activate default EPS bearer context request message to indicated whether the feature is supported by the network. For example, such feature is not supported for the PDN connection if there is no Network support of Local address in TFT indicator included in the activate default EPS bearer context request message. In step 612, UE 601 performs an inter-system change from EPS to 5GS. In step 621, UE 601 converts the PDN connection to a PDU session. UE 601 assumes that Local IP address in TFT feature is supported for the PDU session upon the inter-system change. In step 622, UE 601 performs another inter-system change from 5GS to EPS. In step 631, UE 401 converts the PDU session back to the PDN connection. UE 601 assumes that Local IP address in TFT feature is supported for the PDN connection upon the inter-system change. In step 632, UE 601 receives a modify EPS bearer context request message or an activate dedicated EPS bearer context request message from EPS 603. The request message includes a TFT IE, which carries different TFT operations and a local IP address. The different TFT operations include "create new TFT", "add packet filters to existing TFT", and "replace packet filters in existing TFT". In step 633, UE 601 executes the TFT operation including the local IP address without diagnosing error. In step 634, UE 601 sends a modify EPS bearer context accept message or an activate dedicated EPS bearer context accept message upon successful execution. If UE assumes the network does not support local IP address in TFT, then UE will indicate "semantic error" upon receipt a TFT IE with local IP address.

Figure 7:
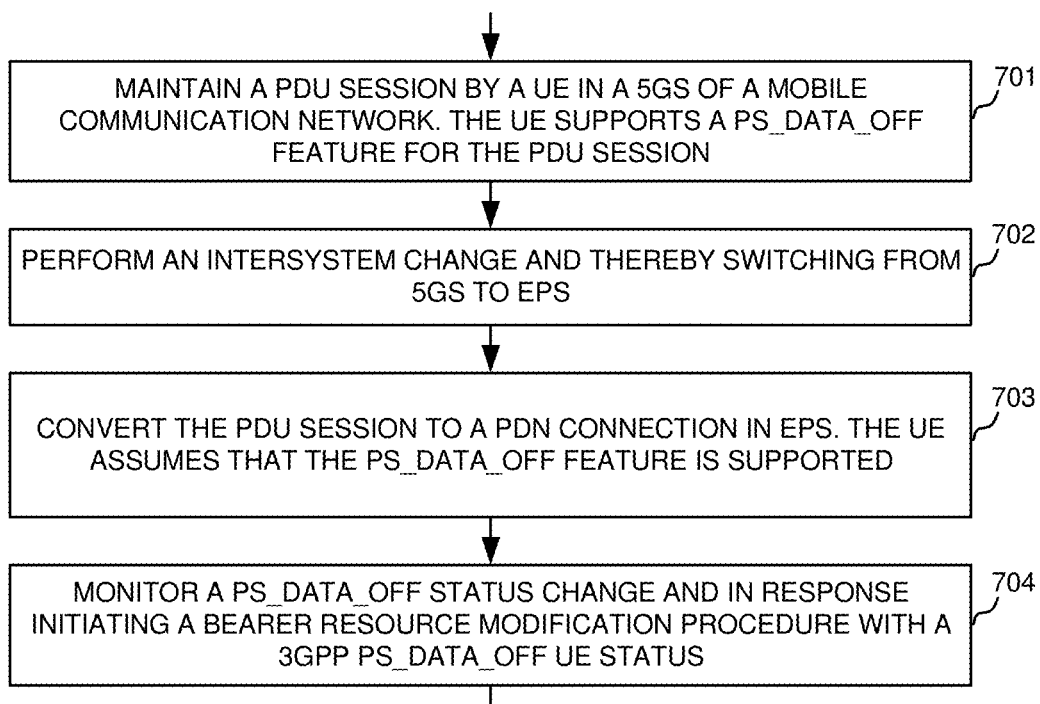
FIG. 7 is a flow chart of a method of handling PS_Data_Off feature during inter-system change in accordance with one novel aspect.

FIG. 7 is a flow chart of a method of handling PS_Data_Off feature during inter-system change in accordance with one novel aspect of the present invention. In step 701, a UE maintains a Protocol data unit (PDU) session in a 5G system (5GS) of a mobile communication network.

The UE supports a packet-switched data-off (PS_Data_Off) feature for the PDU session. In step 702, the UE performs an inter-system change and thereby switching from 5GS to an evolved packet system (EPS). In step 703, the UE converts the PDU session to a packet data network (PDN) connection in EPS. The UE assumes that the PS_Data_Off is feather is supported by the network on the PDN connection after the inter-system change. In step 704, the UE monitors a PS_Data_Off status change and in response initiating a Bearer Resource Modification procedure with a 3GPP PS_Data_Off UE Status.

Figure 8:
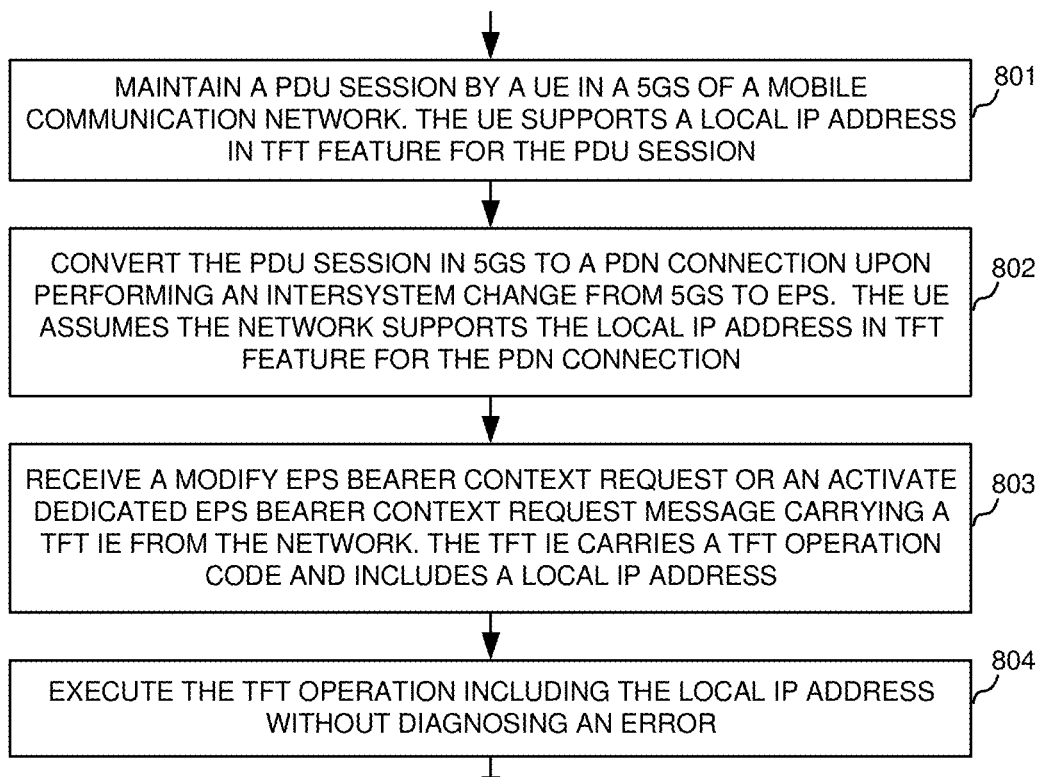
FIG. 8 is a flow chart of a method of handling local IP address in TFT feature during inter-system change in accordance with one novel aspect.

FIG. 8 is a flow chart of a method of handling local IP address in TFT feature during inter-system change in accordance with one novel aspect of the present invention. In step 801, a UE maintains a Protocol data unit (PDU) session in a 5G system (5GS) of a mobile communication network. The UE supports a local IP address in Traffic Flow Template (TFT) feature for the PDU session. In step 802, the UE converts the PDU session in 5GS to a packet data network (PDN) connection upon performing an inter-system change from 5GS to an evolves packet system (EPS). The UE assumes the network supports the local IP address in TFT feature for the PDN connection. In step 803, the UE receives a modify EPS bearer context request or an activate dedicated EPS bearer context request message carrying a TFT information element (IE) from the network. The TFT IE carries a TFT operation code and includes a local IP address. In step 804, the UE executes the TFT operation code including the local IP address without diagnosing an error.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   maintaining a Protocol data unit (PDU) session by a user equipment (UE) in a 5G system (5GS) of a mobile communication network, wherein the UE supports a local IP address in Traffic Flow Template (TFT) feature for the PDU session;
   converting the PDU session in 5GS to a packet data network (PDN) connection upon switching from 5GS to an evolves packet system (EPS), wherein the UE assumes the network supports the local IP address in TFT feature for the PDN connection;
   receiving a modify EPS bearer context request or a activate dedicated EPS bearer context request message carrying a TFT information element (IE) from the network, wherein the TFT IE carries a TFT operation code and includes a local IP address; and
   executing the TFT operation code including the local IP address without diagnosing an error.

2. The method of claim 1, wherein the TFT operation code comprises "create new TFT", "add packet filters to existing TFT", and "replace packet filters in existing TFT".

3. The method of claim 1, wherein the UE transmits a modify EPS bearer context accept message or an activate dedicated EPS bearer context accept message to the network upon successfully executing the TFT operation.

4. The method of claim 1, wherein the UE performs inter-system change from EPS to 5GS and then back to EPS, wherein the UE assumes that the local IP address in TFT feature is supported for the same PDN connection.

5. A User Equipment (UE), comprising:
   a Protocol data unit (PDU) session handling circuit that maintains a PDU session in a 5G system (5GS) of a mobile communication network, wherein the UE supports a local IP address in Traffic Flow Template (TFT) feature;
   a mobility management circuit that converts the PDU session in 5GS to a packet data network (PDN) connection upon switching from 5GS to an evolves packet system (EPS), wherein the UE assumes the network supports the local IP address in TFT feature for the PDN connection;
   a receiver that receives a modify EPS bearer context request or a activate dedicated EPS bearer context request message carrying a TFT information element (IE) from the network, wherein the TFT IE carries a TFT operation code and includes a local IP address; and
   a controller that executes the TFT operation code including the local IP address without diagnosing an error.

6. The UE of claim 5, wherein the TFT operation code comprises "create new TFT", "add packet filters to existing TFT", and "replace packet filters in existing TFT".

7. The UE of claim 5, wherein the UE transmits a modify EPS bearer context accept message or an activate dedicated EPS bearer context accept message to the network upon successfully executing the TFT operation.

8. The UE of claim 5, wherein the UE performs inter-system change from EPS to 5GS and then back to EPS, wherein the UE assumes that the local IP address in TFT feature is supported for the same PDN connection.

* * * * *